Sept. 23, 1941.  E. M. OLLEY  2,257,065
SEALING FITTING FOR ELECTRICAL CONDUIT LINES
Filed July 9, 1940
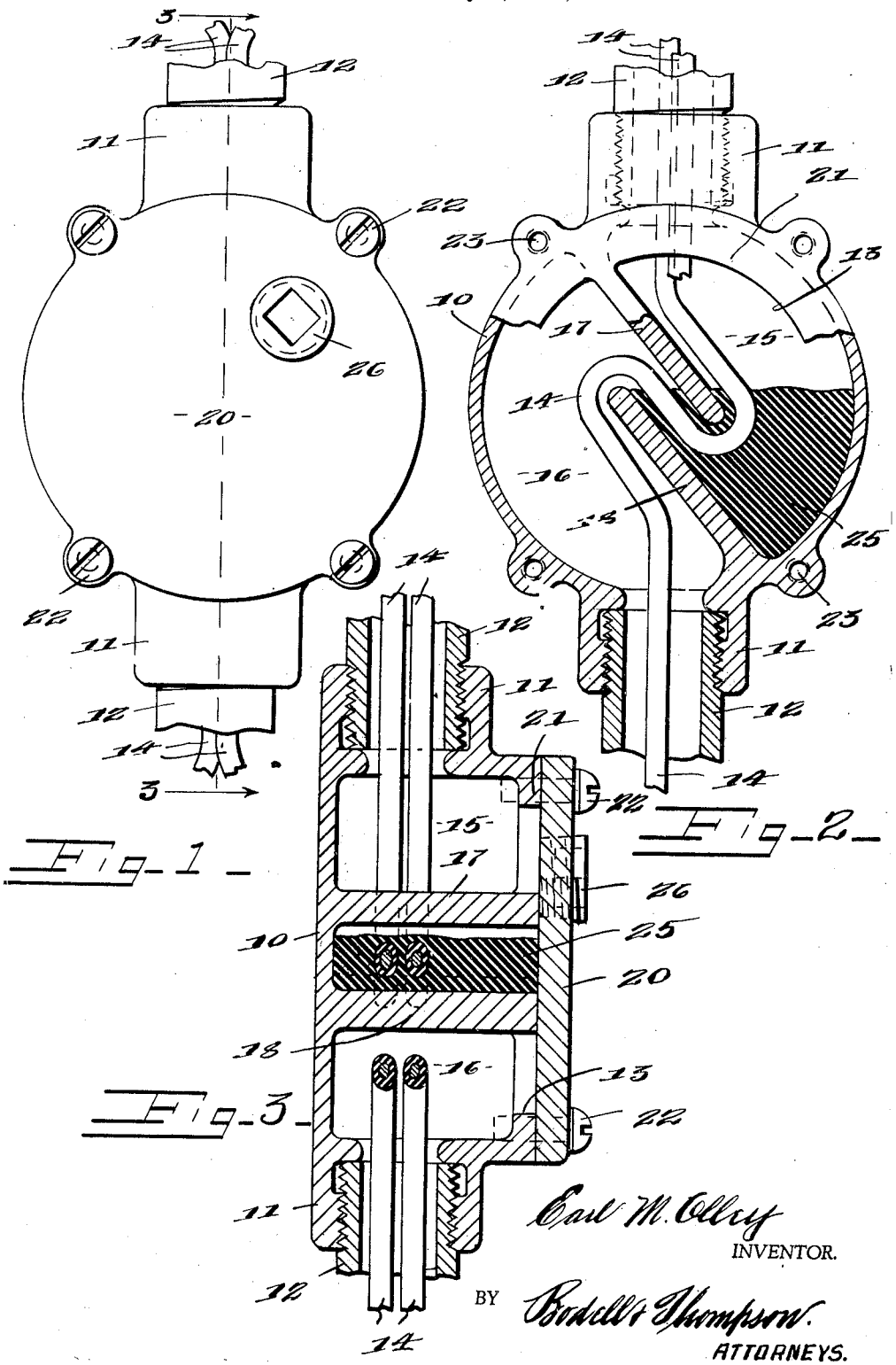
Earl M. Olley
INVENTOR.
BY Bodell & Thompson
ATTORNEYS.

Patented Sept. 23, 1941

2,257,065

UNITED STATES PATENT OFFICE 2,257,065

SEALING FITTING FOR ELECTRICAL CONDUIT LINES

Earl M. Olley, Syracuse, N. Y., assignor to Crouse-Hinds Company, Syracuse, N. Y., a corporation of New York Application July 9, 1940, Serial No. 344,551

2 Claims. (Cl. 174—50)

This invention relates to fittings for sealing off one portion of an electrical conduit line or system from another portion. These fittings are employed in electrical conduit lines which are installed in hazardous locations in order that the conduit system may be divided into sections, or portions, which are sealed off from one another in flame tight relation, whereby if an explosion should take place in one portion of the conduit system it would not follow throughout the system, but would be confined to that portion in which the explosion originated.

A fitting of this type is disclosed in the co-pending application of Carl H. Bissell, Sr., No. 315,567, filed January 25, 1940.

Heretofore, as illustrated in the Bissell fitting, it was necessary to first form a dam in the fitting before flowing the sealing compound therein. The purpose of the dam is to prevent the molten or liquid compound from passing into the conduits connected to the fitting. These fittings are often installed in inaccessible locations, making it extremely difficult for the electrician to properly form the dam and pour the sealing compound into the fitting in order to form an effective and proper flame tight seal. The Bissell application discloses a fitting in which the sealing compound may be conveniently inserted to make a proper seal. However, the difficulty of forming the dam in the fitting still exists.

This invention has as an object a sealing fitting for electrical conduit lines which does not require the formation of a dam for the sealing compound, the fitting embodying a particularly economical and efficient structure by which the interior of the fitting is divided into compartments, each of which connects with a conduit receiving passage, the compartments being so formed as to receive the sealing compound and to establish an effective flame tight seal within the fitting.

The invention consists in the novel features and in the combinations and constructions hereinafter set forth and claimed.

In describing this invention, reference is had to the accompanying drawing in which like characters designate corresponding parts in all the views.

Figure 1 is a front elevational view of a fitting embodying my invention.

Figure 2 is a front elevation of the fitting with the cover removed and being partly in section.

Figure 3 is a vertical sectional view taken on line 3—3, Figure 1.

The fitting consists of a body 10 preferably formed of cast metal and provided with a plurality of hubs 11 threaded internally to form receiving passages for the conduits 12. One side of the body is formed with an opening 13 of appreciable dimension to permit convenient manipulation of the conductors 14 extending through the fitting.

The interior of the fitting is divided into compartments as 15, 16, by partitions 17, 18. The partitions 17, 18 extend inwardly from the wall of the body to a point past the center thereof. Or, in other words, the inner ends of the partitions 17, 18 are arranged in overlapping and spaced relation.

As clearly illustrated in Figure 2, the partitions divide the interior of the fitting into compartments as 15, 16, with each compartment connecting with a conduit receiving passage. The overlapping spaced relation of the inner ends of the partitions 17, 18 effect a reverse loop formation in the conductors 14.

I have illustrated a fitting provided with two hubs 11 arranged diametrically opposite each other in the side wall of the fitting and accordingly, the fitting is provided with two partitions 17, 18 to divide the interior of the fitting into two compartments 15, 16. However, the fitting may be provided with three or four hubs and with an inwardly extending partition arranged adjacent each conduit receiving passage and with the inner ends of the fittings arranged in overlapping spaced relation as indicated.

A cover 20 is provided to close the opening 13. The inner side of the cover and the marginal flange 21 about the opening 13 are provided with smooth coacting surfaces, whereby the cover forms a flame tight closure for the fitting and the outer edges of the partitions 17, 18 are also machined in the same plane as the flange 21, whereby the cover 20 also engages these outer edges of the partitions in flame tight relation.

The fitting is installed in the conduit line during the installation thereof and after the conductors 14 are pulled through the system and arranged in the reverse loop formation referred to, the cover 20 is secured to the open side of the fitting as by screws 22 threading into apertures 23 formed in the body 10. The cover 20 is provided with an aperture arranged in register with one of the compartments 15, 16, this aperture providing a passage for the insertion of the sealing medium 25, after which the aperture is closed as by a plug 26.

It will be observed that one of the partitions as 18 is cooperable with the side wall of the body 10 to form a well or chamber for the reception of the sealing medium 25, and due to the fact that the inner end of the other partition, or partitions, extend past the inner end of the partition 18, the compartments 15, 16 are entirely and effectively sealed off. This structure not only results in a considerable saving of time by avoiding the necessity of forming a dam for the sealing medium, but in addition results in an effective and practical seal. Heretofore, in instances where sealing fittings were not readily accessible the electrician could not be certain that the dam was properly formed, with the result that frequently the seals were improperly made which, of course, completely defeated the purpose for which the fitting was intended.

What I claim is:

1. A sealing fitting for electrical conduit lines comprising a body formed with conduit receiving passages and having an opening in one side, a partition member extending inwardly from the side wall of the body to a point past the center thereof, a second partition member extending inwardly from the opposite side of the fitting, the inner ends of said partitions overlapping and being arranged in spaced relation and being cooperable to effect a reverse loop formation in the conductors extending through the fitting, a cover for the open side of the fitting detachably secured thereto in flame tight relation to said partitions and the marginal surface of the body about said opening, said first partition being cooperable with the body and cover to form a well for receiving a sealing medium.

2. A sealing fitting for electrical conduit lines comprising a body formed with conduit receiving passages and having an opening in one side, a partition member extending inwardly from the side wall of the body to a point past the center thereof, a second partition member extending inwardly from the opposite side of the fitting, the inner ends of said partitions overlapping and being arranged in spaced relation and being cooperable to effect a reverse loop formation in the conductors extending through the fitting, a cover for the open side of the fitting detachably secured thereto in flame tight relation to said partitions and the marginal surface of the body about said opening, said first partition being cooperable with the body to form a well for receiving a sealing medium, and said cover being provided with an aperture arranged to discharge sealing medium into said well.

EARL M. OLLEY.